US012403664B2

(12) United States Patent
Amrine et al.

(10) Patent No.: US 12,403,664 B2
(45) Date of Patent: Sep. 2, 2025

(54) PRODUCTION OF FLOOR MATS

(71) Applicant: Dimex Office Products LLC, Marietta, OH (US)

(72) Inventors: Patrick Amrine, Williamstown, WV (US); Lyle A. James, Kettering, OH (US)

(73) Assignee: Westlake Dimex, LLC, Marietta, OH (US)

( * ) Notice: Subject to any disclaimer, the term of this patent is extended or adjusted under 35 U.S.C. 154(b) by 2 days.

(21) Appl. No.: 18/158,527

(22) Filed: Jan. 24, 2023

(65) Prior Publication Data
US 2023/0249413 A1     Aug. 10, 2023

Related U.S. Application Data

(60) Provisional application No. 63/308,539, filed on Feb. 10, 2022.

(51) Int. Cl.
*B29C 69/00* (2006.01)
*B29L 31/00* (2006.01)

(52) U.S. Cl.
CPC ..... *B29C 69/001* (2013.01); *B29L 2031/7324* (2013.01)

(58) Field of Classification Search
CPC ... B29C 69/00; B29C 69/001; B29C 66/3022; B29L 2031/7324; E04F 11/16
See application file for complete search history.

(56) References Cited

U.S. PATENT DOCUMENTS

| | | |
|---|---|---|
| D11,972 S | 9/1880 | Bourn |
| 4,353,944 A | 10/1982 | Tarui |
| 4,497,858 A | 2/1985 | Dupont et al. |
| D344,426 S | 2/1994 | Kil et al. |
| 5,683,780 A | 11/1997 | Rodger et al. |
| 5,815,995 A * | 10/1998 | Adam ............... E04F 15/02194 52/177 |
| D601,375 S | 10/2009 | Venugopal |
| 8,080,302 B2 | 12/2011 | Gifford et al. |
| D925,248 S | 7/2021 | Venugopal |

(Continued)

FOREIGN PATENT DOCUMENTS

| | | |
|---|---|---|
| GB | 1327739 A | 8/1973 |
| JP | 3878151 B2 | 2/2007 |
| WO | 2006005972 A1 | 1/2006 |

*Primary Examiner* — Alison L Hindenlang
*Assistant Examiner* — Shibin Liang
(74) *Attorney, Agent, or Firm* — Wood Herron & Evans LLP

(57) ABSTRACT

A mat of one or more tiles of desired shape is provided. The mat is produced from a production mat manufactured as an integral unit with multiple tiles connected together according to various embodiments of this invention. The production mat may be divided into one or more mats of desired shape and size by severing the production mat between adjacent tiles. As such, the production mat may be cut into discrete mats, each having one or more tiles according to this invention. The entirety of the production mat is used as one or more mats according to aspects of this invention thereby avoiding waste and/or recycling of any portion of the production mat while utilizing each of the tiles in the production mat as part of the resulting mat(s). This avoids the need for any supplemental or auxiliary connecting means for joining two adjacent tiles to form a mat.

20 Claims, 4 Drawing Sheets

(56) References Cited

U.S. PATENT DOCUMENTS

| | | |
|---|---|---|
| 2003/0143358 A1 | 7/2003 | Needles |
| 2004/0185221 A1 | 9/2004 | Hood et al. |
| 2014/0144092 A1* | 5/2014 | Benz .................... E04F 15/082 |
| | | 52/384 |
| 2019/0211514 A1* | 7/2019 | Jones .................... H02G 9/025 |
| 2019/0246872 A1 | 8/2019 | Koenings |

* cited by examiner

PRODUCTION OF FLOOR MATS

BACKGROUND

This claims the benefit of U.S. Provisional Application Ser. No. 63/308,539, filed Feb. 10, 2022 and hereby incorporated by reference in its entirety.

This invention relates generally to the field of floor coverings, and in particular, to systems and methods for producing shapes of floor mats.

In the past, carpet tile has only been used for wall-to-wall floor covering similar to wall-to-wall carpeting. Complete wall-to-wall placement of the carpet tiles was necessary because lateral support is needed to hold the tiles adjacent one another on the floor in the grid pattern and prevent slippage of one tile relative to an adjacent tile.

Restriction of tiles to wall-to-wall use has precluded the use of tiles as floor mats or rugs or as self-contained floor covering. There are many situations where a full wall-to-wall coverage is not required or desired. In hospitals, for example, because of heavy traffic of heavy rolling stock, large carpeted areas in hallways and rooms are to be avoided. Carpets increase friction and have problems such as carpet wrinkling. Certain entrance areas, though, do require mats for safety and foot cleaning purposes. Often the space to be covered by the mat is a unique shape and cannot be satisfactorily covered with a standard size and shape mat.

Slippery and unsafe floor surfaces create a substantial risk of injury to pedestrians who walk on such surfaces while at work and/or at leisure. A fall on a slippery surface may result in broken bones and soft tissue injuries to an individual, with the potential for long term disabilities, lost work time, lost revenues and income, and resultant societal issues of medical costs and insurance and legal actions.

Slippery floor surfaces may be found in a variety of locations, including public buildings, commercial establishments, and industrial plants. Typically, a slippery floor surface is created when water, mud, snow, grease, and/or other substances are on an area of a floor, fail to drain properly away from the area, and collect. Due to physical properties inherent to the substances, the collected substances reduce the coefficient of friction normally present between an individual's shoe and the floor at the site of the spill, thereby establishing a slippery spot on the floor where shoe traction is significantly reduced over its ordinary level. Locations which are prone to producing slippery floor surfaces generally include building entrances and exits, restaurant kitchens and service areas, customer self-help areas at convenient stores and gas stations, wet therapy areas of medical facilities, and areas found under leaky pipes and/or equipment.

Historically, various types of floor coverings, including mats, ribbed rugs, and wooden slatted platforms, have been employed in an effort to eliminate slippery surfaces and, hence, deter people from slipping and/or falling. Unfortunately, among other shortcomings, such coverings are often unavailable in a size or shape which is appropriate for a particular area of floor surface and, as a result, multiple smaller coverings must be joined together to adequately cover an area.

It is well known to produce small mat units and join a number of such units together to form a mat of a desired size and/or shape. However, such a scheme requires the use of a means to join the individual mat units together, which typically calls for a labor intensive task of arranging and physically joining discrete mat units together. Additionally, the joint mechanism may fail when the assembled mat is in service thereby creating a tripping hazard and the requirement for additional labor to remedy the failed joint. Moreover, the joint may fail when the mat is being cleaned which would also require the attention of a service personnel or other individual to re-join the individual mat units together prior to returning the mat to service. Further, the joint mechanism is an additional component for the multi-unit mat assembly which drives up the cost of production for the mat.

While, perhaps, reducing the risk of an individual slipping or falling, seams between the coverings, produced by a joining process, create an additional hazard because individuals may trip over an improperly formed seam while traversing the covering. Additionally, such seams often come apart and an individual may trip over an exposed internal edge of a covering or, more frequently, an individual may trip over a blunt, exposed, outer perimeter edge of such coverings. Certain coverings, such as mats and ribbed rugs, are also susceptible to creeping across or moving relative to a floor surface in response to constant foot traffic, thereby exposing a slippery area of the floor surface which was supposed to be covered by the mat or ribbed rug.

Naturally, unitary mats for specific applications and settings may be custom made of a desired shape and size. However, such a supply means for mats of numerous different settings is very time consuming and expensive. Bespoke mat designs would be prohibitively expensive and therefore, impractical in a commercial supply setting.

There is, therefore, a need in the industry for the production of a floor covering system which is particularly sized and shaped for the setting and effectively and efficiently diminishes the probability of slip and fall mishaps by producing secure footing in otherwise hazardous areas and can solve other related and unrelated problems that become apparent upon reading and understanding this specification.

SUMMARY OF THE INVENTION

The above and other objects and advantages in accordance with the principles of this invention shall be made apparent from the accompanying drawings and the description thereof.

In accordance with this invention, a mat of one or more tiles and of desired shape is provided, which has a base and low walls surrounding the base to hold water on the base. Scraping elements, such as ribs, are provided on the base within the walls, projecting up from the base so that snow and/or water and/or slush can be scraped off the feet of people walking on a mat made up of the tiles. No connecting means are required to join the tiles together because mats of multiple tiles are integrally formed. A production mat is manufactured as an integral unit with multiple tiles connected together according to various embodiments of this invention. The production mat may be cut or divided into one or more mats of desired shape and size by severing the production mat between adjacent tiles. As such, the production mat may be cut into discrete mats, each having one or more tiles according to this invention. The entirety of the production mat is used as one or more mats according to aspects of this invention thereby avoiding waste and/or recycling of any portion of the production mat while utilizing each of the tiles in the production mat as part of the resulting mat(s). This avoids the need for any supplemental or auxiliary connecting means for joining two adjacent tiles to form a mat while still providing mats of desired shapes and sizes for specific settings as needed.

The invention is particularly directed toward a tile for use in constructing a mat, the tile may have a flat base with a quadrangular shape. A low rib is provided along the perimeter of the base, to hold water on the base. Scraper elements are provided on the base within the walls. Channels may be provided in the scraper elements to allow excess water to flow off the scraper elements.

The production mat of one or more tiles may be molded in one piece from rubber-like plastic material, such as P.V.C., so they are flexible and watertight according to some embodiments of this invention.

Also in accordance with this invention, each tile is provided with water directing means for directing water between the tile and one or more adjacent tiles so as to distribute water more uniformly over the surface of a mat made up from the tiles. The water directing means preferably comprises one or more shallow furrows formed in the top of each tile. When the water level in a tile reaches the height of the channels in its walls, the water flows out of the tile through the channels into adjacent tiles. In this manner water accumulated in the mat is generally evenly distributed over the mat before overflow occurs.

One purpose of this invention is to provide a mat of one or more tiles, a plurality of which may be integrally manufactured together to form a mat of desired size and/or shape. Various sizes of mats can be constructed from the tiles, using only that number of tiles needed to make each desired size and shape of mat. According to one aspect of this invention, each mat size is a multiple of the tile size.

Another purpose of this invention to provide a tile which can retain a relatively large amount of water thereby providing a mat, made from the tiles, which can also retain a relatively large amount of water. A further purpose of this invention to provide a mat, made from tiles, in which water can be distributed over the surface of the mat. Thus, as water accumulates in the tiles of the most used portion of the mat, tiles allow the water to be distributed to less used portions of the mat before it is allowed to spill off the mat. Thus the mat can hold more water before overflow occurs.

The periphery of each tile may include a wall or edge about the tile for retaining water on the mat by blocking those channels in the walls of the tiles forming the outer edge of the mat.

A further aspect of this invention is the production of a mat and a production mat from which the mat is derived.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
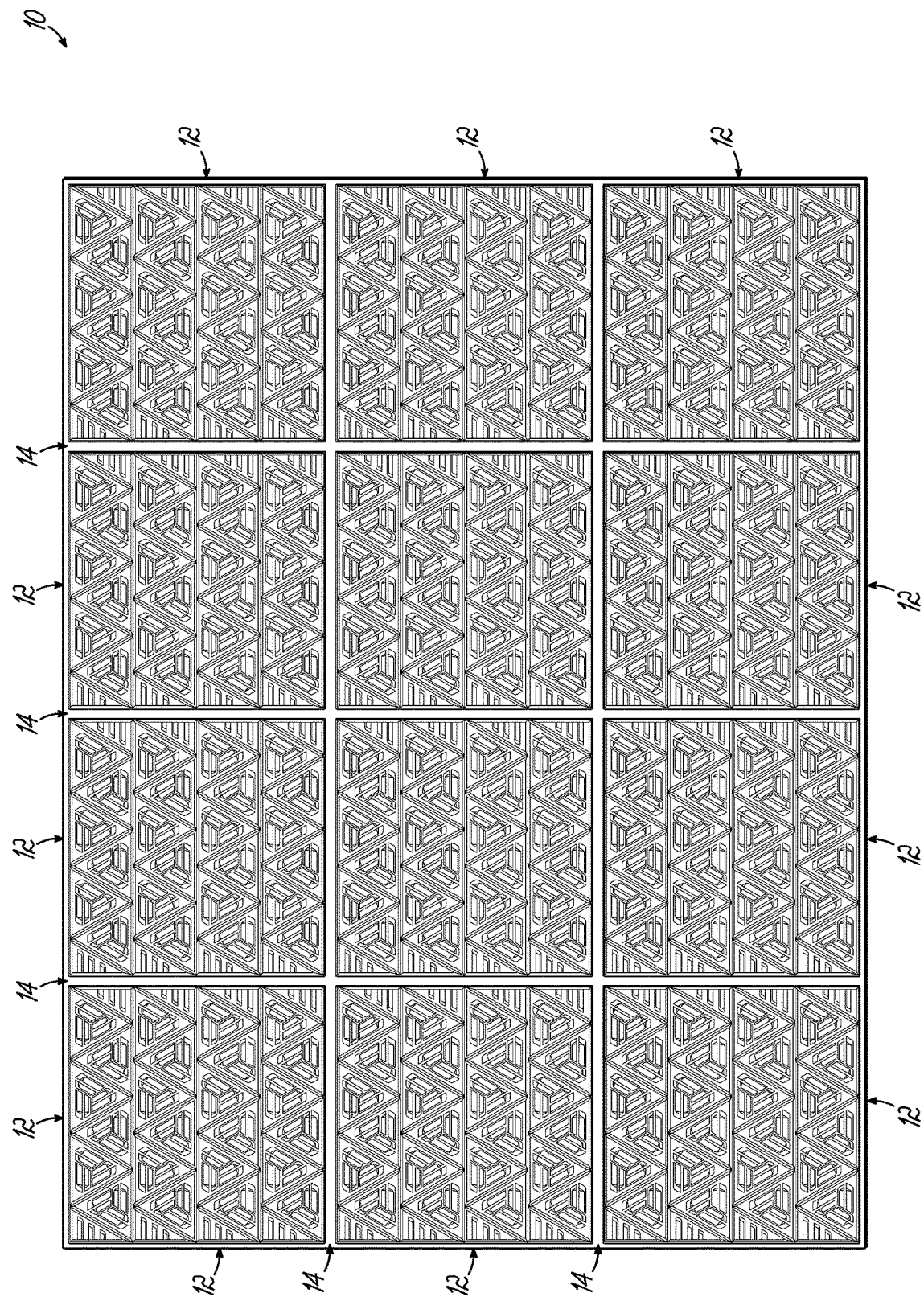
FIG. 1 is a top plan view of one embodiment of a production mat according to this invention.

Referring to FIG. 1, one embodiment of a production mat 10 according to this invention is shown. The production mat 10 includes a number of individual tiles 12 all integrally joined together in the production mat 10. The production mat 10 according to this invention is produced, manufactured, molded, and/or made as an integral unit with the multiple mat tiles 12 formed therein. The production mat 10 of one or more tiles 12 may be molded in one piece from rubber-like plastic material, such as P.V.C., so the tiles 12 are flexible and watertight according to some embodiments of this invention. The individual tiles 12 may be as disclosed in U.S. patent application Ser. No. 29/819,017, filed Dec. 13, 2021 and hereby incorporated by reference in its entirety. Alternatively, the tiles 12 may have another shape, design and/or presentation within the scope of this invention.

Figure 2:
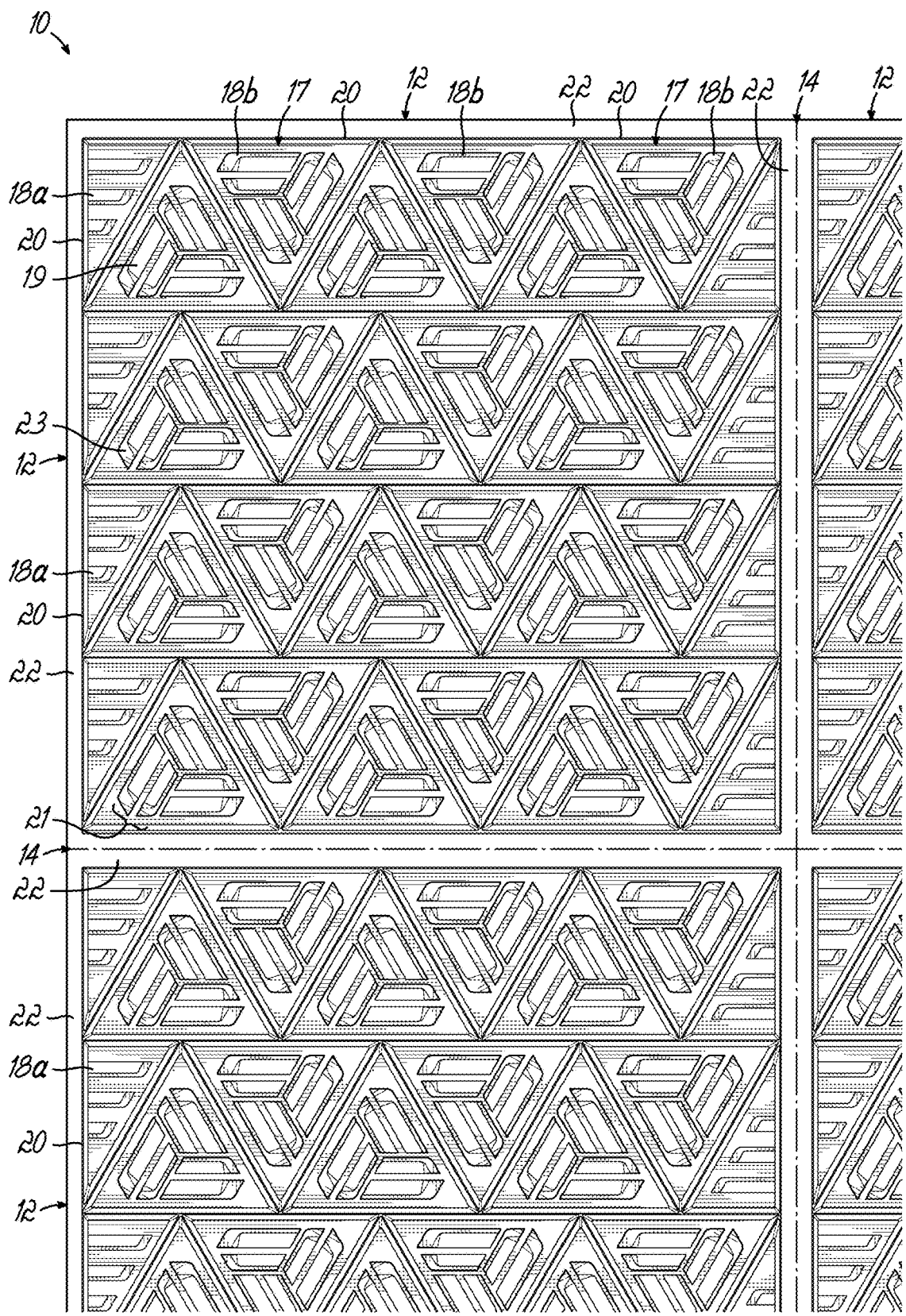
FIG. 2 is an enlarged view of the production mat of FIG. 1 showing one of the tiles of the production mat and portions of adjacent tiles.

The tiles 12 may form a scraper mat 16 which are typically placed at exterior doorway thresholds to remove debris from shoes as people enter a building. The production mat 10 of FIG. 1 shows a 3'×4' embodiment incorporating a 1'×1' repeating tile 12 with a ½" boarder channel junction 14 so that the production mat 10 can be trimmed to a width and length at 1' intervals. Within each 1'×1' tile 12, a scraper pattern is formed on an upper face of the mat 16 and in one embodiment incorporates a triangular grid 17 of ribs 18 and an upstanding solid rim 20 around the 1'×1' pattern to contain debris so that water, dirt, mud, snow, etc. is not able to spill off the edge of the mat 16 as best seen in FIG. 2. Within each triangle 17 are a series of ribs 18 oriented at three different angles with ramped sides 19 to improve rigidity of the ridges, and spaced to increase the debris containment volume and to better penetrate the soles of shoes. The ribs 18 may be arranged in pairs 21 similarly oriented with a shorter rib 18*a* and a longer rib 18*b* in each pair. Each rib 18 includes a generally flat, L-shaped upper portion 23 from which the associated ramped side 19 extends downwardly. Both the variation in ridge orientation and the spacing is expected to improve the scraping/cleaning performance.

The individual tiles 12 are separated one from another by a junction 14 which may be in the form of a channel or other arrangement between adjacent tiles 12. The individual tiles 12 and each associated junction 14 are contiguous and integral one with another in the production mat 10 according to various embodiments of this invention. In the production mat 10 shown in FIG. 1, twelve tiles 12 are formed into a 3×4 arrangement with three junction lines 14 in one direction between adjacent tiles 12 and two junction lines 14 in a perpendicular direction between adjacent tiles 12.

Figure 3:
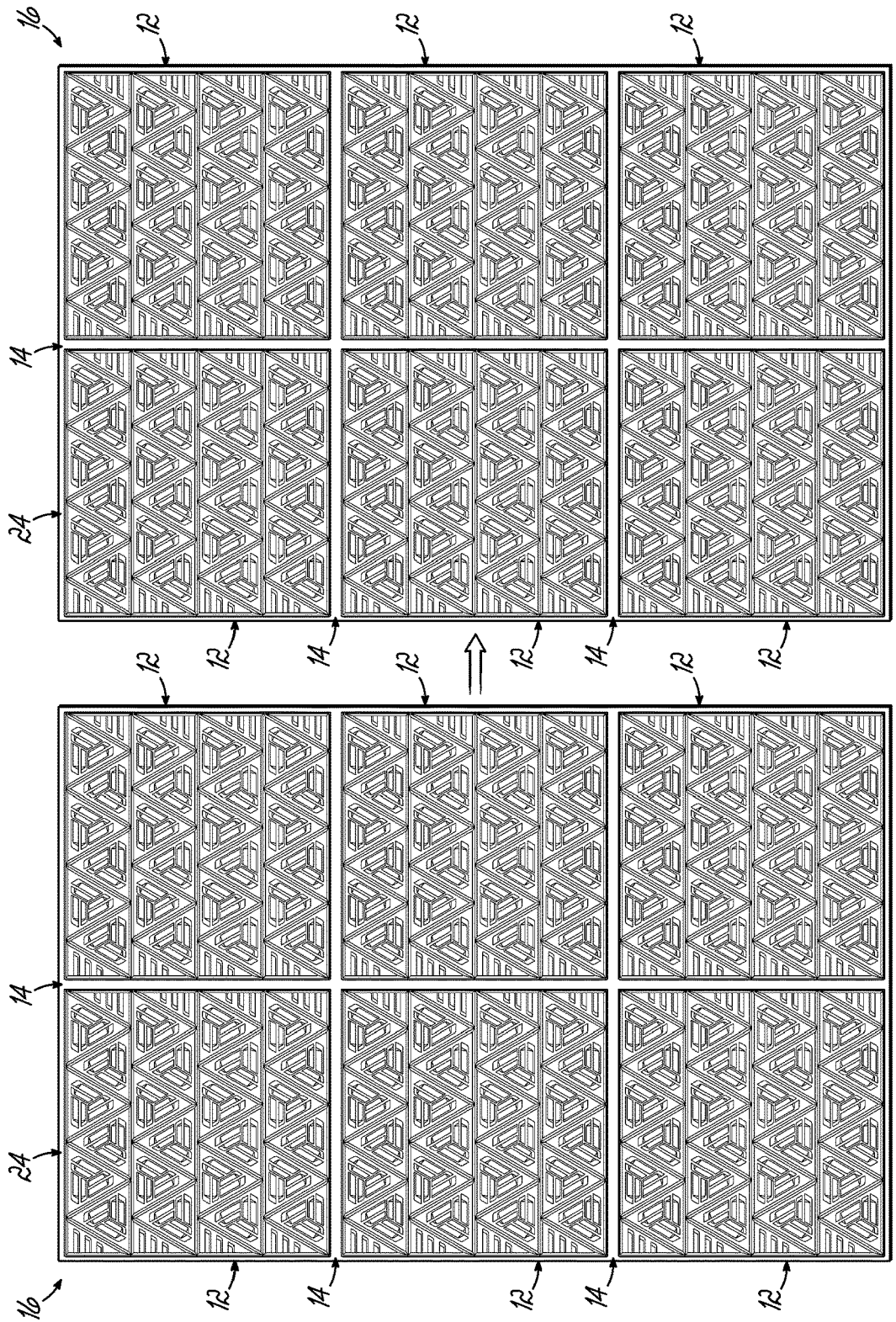
FIG. 3 is a top plan view of two multi-tile mats resulting from the production mat of FIG. 1.
Figure 4:
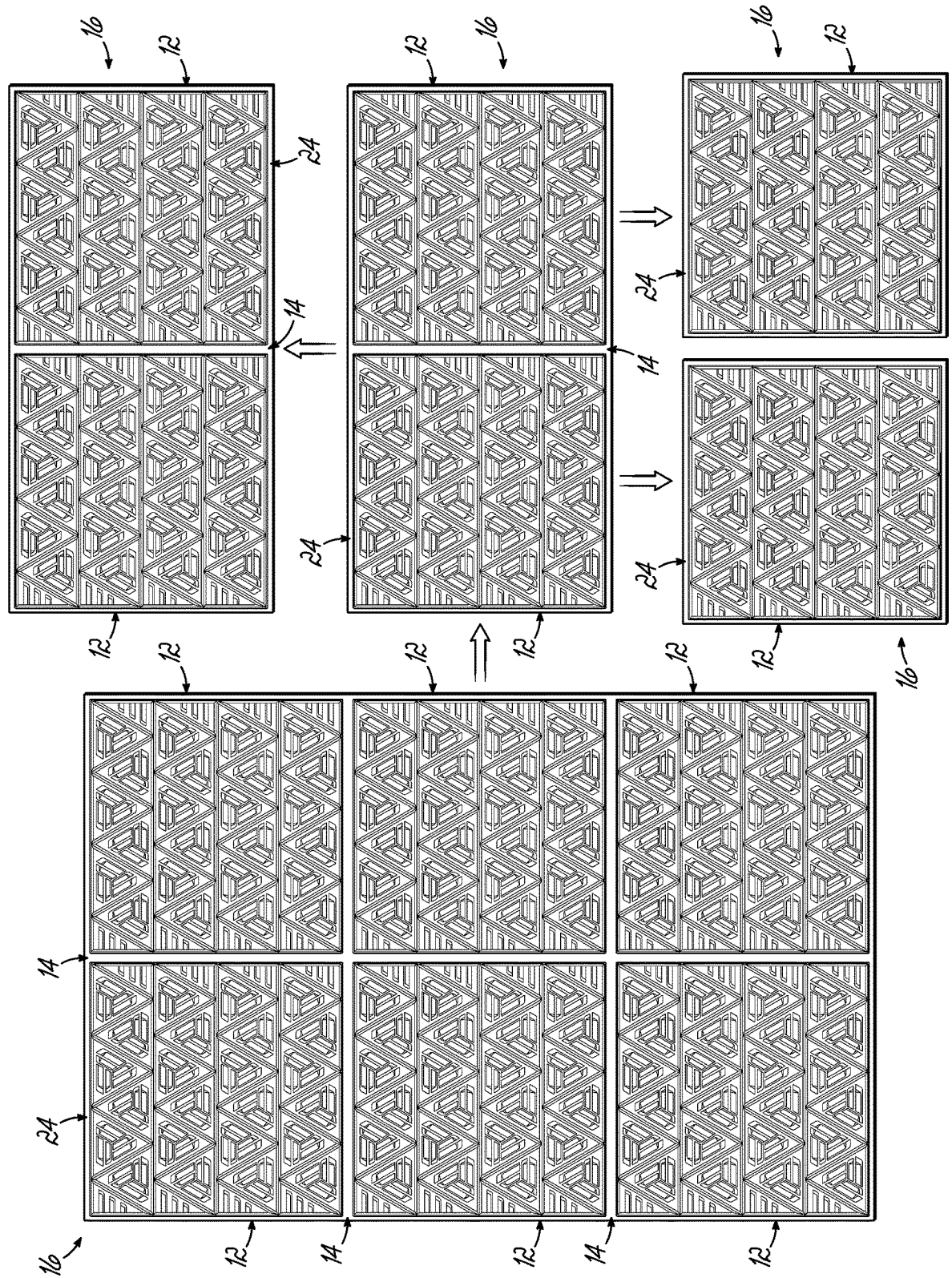
FIG. 4 is a top plan view of multiple mats resulting from one of the multi-tile mats of FIG. 3.

The production mat 10 may be divided into individual mats 16 each of which include one or more tiles 12, as shown in FIGS. 3 and 4. In the arrangement of FIG. 3, the twelve tile 12 production mat 10 is divided into two mats 16 each having six tiles 12 by separating the production mat 10 along the junction line 14 bisecting the production mat 10. As a result of dividing the production mat 10 in this manner, two mats 16 are produced therefrom, each mat 16 being six tiles 12 and none of the production mat 10 is wasted, scrapped and/or unused in the process. As such, the resulting mats 16 are of a bespoke design for the desired installation or setting while still offering an efficient and waste-free manufacture of the production mat 10.

It will be understood by one ordinary skill in the art, that the production mat 10 may be divided in many different ways to result in multiple mats 16. For example, as shown in FIG. 4, one of the six tile 12 mats 16 shown in FIG. 3 may be further divided into two mats 16 each of two tiles 12 and two more mats 16 each of one tile 12. Here again, all of the production mat 10 is utilized to yield multiple individual mats 16 each of a desired shape and size without any scrap or waste.

The production mat 10 may be cut along the appropriate channel 14 to result in the mats 16 having the desired number of tiles 12. The channel 14 may be cut at its midspan to thereby dissect the channel 14 and allow for an equal portion of the original channel 14 remaining attached to the adjacent tile 12. The rim 20 surrounding each tile 12 is offset from the perimeter edge of the resulting tile 12 or mat 16 when the channel 14 is cut to separate the production mat 10 as desired. The channel 14 may be cut by a utility knife, industrial or other scissors or any other appropriate means. A straight edge (not shown) may be used to guide the cutting implement so as to (as closely as possible) bisect the channel 14 leaving equal portions thereof attached to each adjacent tile 16 to form the rim 20.

In one aspect of this invention, the same mold may be used to produce identical production mats 10 each of which may be divided into different sizes, shapes an arrangements of mats 16 without any waste or scrap. The production mats 10 according to aspects of this invention include a multiple of tiles 12 and each resulting mat 16 has at least one or a multiple of tiles 12 (i.e., one tile, two tiles, six tiles, etc.). The invention is not limited any particular number of tiles 12 in the production mat 10, nor any particular number of tiles 12 in the resulting mats 16, nor any particular shape or design of the tiles 12 themselves.

Each tile 16 may have a perimeter tile border 22 which in some cases is approximately half of the width of the junction 14 between adjacent tiles 12 in the production mat 10. The tile borders 22 of the individual tiles 16 may contribute to form a mat border 24 of the mat 16.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A method of producing a plurality of mats comprising the steps of:
    manufacturing a production mat having a plurality of similarly sized and shaped tiles integrally joined together, the plurality of tiles being integrally joined together by a plurality of junctions formed in the production mat; and
    separating a first set of the plurality of tiles from a second set of the plurality of tiles by severing the production mat along at least one of the plurality of junctions;
    wherein the first set of the plurality of tiles form a first mat and the second set of the plurality of tiles form a second mat; and
    forming a scraper pattern on an upper surface of each of the plurality of tiles, wherein the scraper pattern further comprises a plurality of upwardly projecting ribs arranged in a plurality of triangles on the upper surface, wherein the plurality of upwardly projecting ribs in each of the plurality of triangles is arranged in three pairs with the upwardly projecting ribs of each pair being parallel to each other and each of the plurality of pairs forming a leg of one of the plurality of triangles, wherein each of the plurality of upwardly projecting ribs includes an asymmetrical cross-sectional profile which includes a ramped side which is oppositely oriented with respect to the ramped side of the associated upwardly projecting rib in the respective pair.

2. The method of claim 1 wherein the manufacturing step further comprises molding the production mat.

3. The method of claim 1 wherein the separating step further comprises cutting the production mat along the at least one of the plurality of junctions.

4. The method of claim 1 wherein the first set of the plurality of tiles is equal in number to the second set of the plurality of tiles.

5. The method of claim 1 wherein the first set of the plurality of tiles is different in number from the second set of the plurality of tiles.

6. The method of claim 1 wherein the first and second mats are of the same shape.

7. The method of claim 1 wherein the first mat is of a first shape and the second mat is of a second shape different from the first shape.

8. The method of claim 1 wherein all of the production mat is used in the first and second mats.

9. The method of claim 1 wherein each of the plurality of tiles is square.

10. The method of claim 1 wherein each of the plurality of tiles further comprises an upstanding rim proximate a perimeter of the tile to contain a volume of fluid atop the tile.

11. The method of claim 1 wherein the separating step further comprises:
    bisecting the at least one of the plurality of junctions being severed to result in a first rim bordering the first mat and a second rim bordering the second mat.

12. The method of claim 1 wherein the plurality of upwardly projecting ribs in each of the plurality of triangles is arranged in three different orientations.

13. The method of claim 1 wherein each upwardly projecting rib further comprises:
    an uppermost generally flat L-shaped portion from which the associated ramped side extends downwardly therefrom.

14. A method of producing a plurality of mats comprising the steps of:
    molding a production mat having a plurality of similarly sized and square shaped tiles integrally joined together, the plurality of tiles being integrally joined together by a plurality of junctions formed in the production mat, the molding step further comprising forming a scraper pattern of a plurality of upstanding ribs on an upper surface of each of the plurality of tiles;
    wherein the scraper pattern further comprises a plurality of upwardly projecting ribs arranged in a plurality of triangles on the upper surface, wherein the plurality of upwardly projecting ribs in each of the plurality of triangles is arranged in three pairs with the upwardly projecting ribs of each pair being parallel to each other and each of the plurality of pairs forming a leg of one of the plurality of triangles, wherein each of the plurality of upwardly projecting ribs includes ribs includes an asymmetrical cross-sectional profile with a ramped side which is oppositely oriented with respect to the ramped side of the associated upwardly projecting rib in the respective pair; and
    cutting a first set of the plurality of tiles from a second set of the plurality of tiles by severing the production mat along at least one of the plurality of junctions;
    wherein the first set of the plurality of tiles form a first mat and the second set of the plurality of tiles form a second mat;
    wherein all of the production mat is used in the first and second mats;

wherein the cutting step further comprises bisecting the at least one of the plurality of junctions being severed to result in a first rim bordering the first mat and a second rim bordering the second mat.

15. The method of claim 14 wherein the first set of the plurality of tiles is equal in number to the second set of the plurality of tiles.

16. The method of claim 14 wherein the first set of the plurality of tiles is different in number from the second set of the plurality of tiles.

17. The method of claim 14 wherein the first and second mats are of the same shape.

18. The method of claim 14 wherein the first mat is of a first shape and the second mat is of a second shape different from the first shape.

19. The method of claim 14 wherein the plurality of upwardly projecting ribs in each of the plurality of triangles is arranged in three different orientations.

20. The method of claim 14 wherein each upwardly projecting rib further comprises:
   an uppermost generally flat L-shaped portion from which the associated ramped side extends downwardly therefrom.

* * * * *